United States Patent Office 2,793,164
Patented May 21, 1957

2,793,164

SYNTHESIS OF STEROIDS

Josef Fried, New Brunswick, and Richard W. Thoma, Somerville, N. J., assignors to Olin Mathieson Chemical Corporation, New York, N. Y., a corporation of Virginia No Drawing. Application November 30, 1956, Serial No. 625,248

2 Claims. (Cl. 195—51)

This application is a continuation-in-part of our parent application, Serial No. 577,454, filed April 11, 1956, which in turn is a continuation-in-part of our application, Serial No. 349,975, filed April 20, 1953, and now Patent No. 2,756,179, granted July 24, 1956.

This invention relates to, and has for an object the provision of, a microbiological method for the production of prednisolone ($\Delta^{1,4}$-pregnadiene-11$\beta$,17$\alpha$,21-triol-3,20-dione). More particularly, it is the object of this invention to provide a fermentation process for dehydrogenating the steroid, hydrocortisone, or a 21-ester thereof, involving the use of *Streptomyces lavendulae* (or enzymes thereof).

In the practice of this invention, the dehydrogenation may be effected in a growing culture of *Streptomyces lavendulae* by either adding the steroid to the culture during the incubation period, or by including it in the nutrient medium prior to inoculation. In any case, assimilable sources of nitrogenous materials (for growth-promotion) and carbon-containing materials (as energy source) should be present in the culture medium. Also, an adequate, sterile air supply should be maintained during the process, e. g., by the conventional techniques of (1) exposing a large surface of the medium to air, or (2) submerged culture.

Alternatively, the dehydrogenation may be effected by subjecting the steroid to the action of enzymes of *Streptomyces lavendulae* (i. e., by bringing together, in an aqueous medium, the steroid, oxygen and nonproliferating cells of the microorganism).

As the steroid, hydrocortisone and its 21-esters may be used. The preferred esters are those of hydrocarbon carboxylic acids having less than ten carbon atoms, as exemplified by the lower alkanoic acids (e. g., acetic, propionic and tert-butyric acid), the monocyclic aryl carboxylic acids (e. g., benzoic and toluic acid), the monocyclic aryl lower alkanoic acids (e. g., phenacetic and $\beta$-phenylpropionic acids), the lower alkenoic acids, the cycloalkanecarboxylic acids, and the cycloalkenecarboxylic acids.

The sources of nitrogenous, growth-promoting factors may be natural organics (e. g., soybean meal, cornsteep liquor, meat extract and/or distillers' solubles) or synthetics such as nitrates and ammonium compounds.

As to the energy-source material, lipids, especially (1) fat acids having at least 14 carbon atoms, (2) fats or (3) mixtures thereof, are preferred. Examples of such fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fat acids are stearic, palmitic, oleic, linoleic and myristic acids. However, other carbon-containing materials may also be used. Examples of such materials are glycerol, glucose, fructose, sucrose, lactose, maltose, dextrins, starches and whey. These materials may be used either in purified state or as concentrates, such as whey concentrate, cornsteep liquor, or grain mashes (e. g., corn, wheat or barley mash). Mixtures of the above may, of course, be employed. It is to be noted, however, that the steroid is added to the fermentation medium essentially as a precursor and not as an energy source.

The following examples are illustrative of the invention but are not to be construed as a limitation thereof:

*Example 1*

(a) *Fermentation.*—A medium of the following composition is prepared: soybean meal, 15.0 g.; glucose, 10.0 g.; soybean oil, 2.2 g.; hydrocortisone, 0.5 g.; and distilled water to make 1 liter. The medium is adjusted to pH 7.0±0.1. Then nine 100-ml. portions of the medium are distributed in 500-ml. Erlenmeyer flasks, and the flasks plugged with cotton and sterilized in the usual manner (i. e., by autoclaving for 30 minutes at 120° C.). When cool, each of the flasks is inoculated with 5% of a vegetative inoculum of *Streptomyces lavendulae* WC 3440-14 (available in the Waksman Collection of the Institute of Microbiology, Rutgers University, New Brunswick, New Jersey, under the catalogue number 3440-14). [The vegetative inoculum is grown from stock cultures (lyophilized vial or agar slant) for 48–72 hours (with or without transfer and additional incubation for 24–48 hours) in a medium of the following composition: soybean meal, 15.0 g.; sodium chloride, 5.0 g.; cerelose, 21.6 g.; distilled water to make 1 liter.] The flasks are then placed on a 120 cycle per minute, 1½" displacement reciprocating shaker and mechanically shaken at 25° C. for five days. The contents of the flasks are then pooled and, after the pH of the culture is adjusted to about 3.6 with sulfuric acid, filtered (using Seitz filter pads or other suitable filtering media) to separate the mycelium from the fermented medium. Flasks and mycelium are washed with water; the total volume of filtrate (plus wash) is 1050 ml.

(b) *Isolation.*—One liter of the culture filtrate is extracted with four 750-ml. portions of chloroform and the combined extracts evaporated to dryness in vacuo. The residue (about 440 mg.) is dissolved in 8 ml. of chloroform and 4 ml. of benzene and the resulting solution chromatographed on 8.8 g. of 100–200 mesh silica gel. Chloroform-benzene 2:1 (350 ml.) and chloroform (500 ml.) elute amorphous material, which is followed by crystalline fractions when the eluant is changed to chloroform-acetone 9:1 (300 ml.) and 3:1 (300 ml.). The material obtained after evaporation of the chloroform-acetone 9:1 eluates (about 15 mg.) as well as the first 14 mg. eluted with the 3:1 mixture of the above solvents is recrystallized from acetone and furnishes unchanged hydrocortisone, identified by M. P. (218–219°) and infrared spectrum. The remaining crystalline material (about 17 mg.) eluted with the latter solvent mixture on recrystallization from acetone furnishes prednisolone, identified by melting point (235–237°) and infrared spectrum.

*Example 2*

By following the procedure of Example 1 but substituting hydrocortisone 21-acetate for the hydrocortisone, there is obtained prednisolone.

In a similar manner, by substituting other 21-esters of hydrocortisone for the hydrocortisone in the procedure of Example 1, prednisolone is also obtained.

The invention may be otherwise variously embodied within the scope of the appended claims.

We claim:

1. A process which comprises aerobically growing a culture of *Streptomyces lavendulae* in a nutrient medium, exposing to the action of enzymes produced by said culture a steroid selected from the group consisting of hydrocortisone and 21-esters thereof, and recovering prednisolone therefrom.

2. The process of claim 1, wherein the steroid is hydrocortisone.

References Cited in the file of this patent
UNITED STATES PATENTS

| | | |
|---|---|---|
| 2,602,769 | Murray et al. | July 8, 1952 |
| 2,756,179 | Fried et al. | July 24, 1956 |

OTHER REFERENCES

Fried et al.: J. A. C. S., vol. 75, Nov. 20, 1955, pages 5764–5765.